United States Patent
Berg

[11] 3,708,995
[45] Jan. 9, 1973

[54] CARBON DIOXIDE FOOD FREEZING METHOD AND APPARATUS

[76] Inventor: Dennis R. Berg, 10216 Vultee No. 102, Downey, Calif. 90241

[22] Filed: March 8, 1971

[21] Appl. No.: 121,987

Related U.S. Application Data

[63] Continuation-in-part of Ser. No. 882,662, Dec. 5, 1969, abandoned.

[52] U.S. Cl. .......................... 62/63, 62/374, 62/380, 62/514, 99/192, 99/198
[51] Int. Cl. ............................................. F25d 13/06
[58] Field of Search ...................... 62/8, 40, 62–64, 62/77, 168, 214, 216, 374, 375, 380, 514

[56] References Cited

UNITED STATES PATENTS

| | | | |
|---|---|---|---|
| 3,435,632 | 4/1969 | Fallin | 62/322 |
| 2,475,755 | 7/1949 | Pearson | 62/514 X |
| 3,503,221 | 3/1970 | Martin | 62/77 |
| 3,109,296 | 11/1963 | Williamson et al. | 62/514 X |
| 2,496,816 | 2/1950 | Schlumbohm | 62/514 X |
| 2,666,669 | 1/1954 | Wahlin | 239/468 |
| 3,001,374 | 9/1961 | Hutton, Jr. | 62/514 X |
| 3,400,550 | 9/1968 | Guiffre | 62/64 |
| 3,561,226 | 2/1971 | Rubin | 62/66 |

*Primary Examiner*—Meyer Perlin
*Assistant Examiner*—Ronald C. Capossela
*Attorney*—Fulwider, Patton, Rieber, Lee & Utecht

[57] ABSTRACT for quick freezing foodstuff consisting of placing the foodstuff on a conveyor for being conveyed through a freezing tunnel; delivering liquid $CO_2$ to the tunnel and spraying it into such tunnel in gaseous form and circulating the gas in heat exchange relationship with the foodstuff; sensing the temperature in the tunnel and controlling the rate of $CO_2$ delivered to the nozzle to maintain the temperature in the tunnel in a range slightly above the boiling temperature of $CO_2$ to thereby effect relatively rapid freezing of the foodstuff moving along the conveyor while preventing solidification of the $CO_2$ within the tunnel.

20 Claims, 9 Drawing Figures

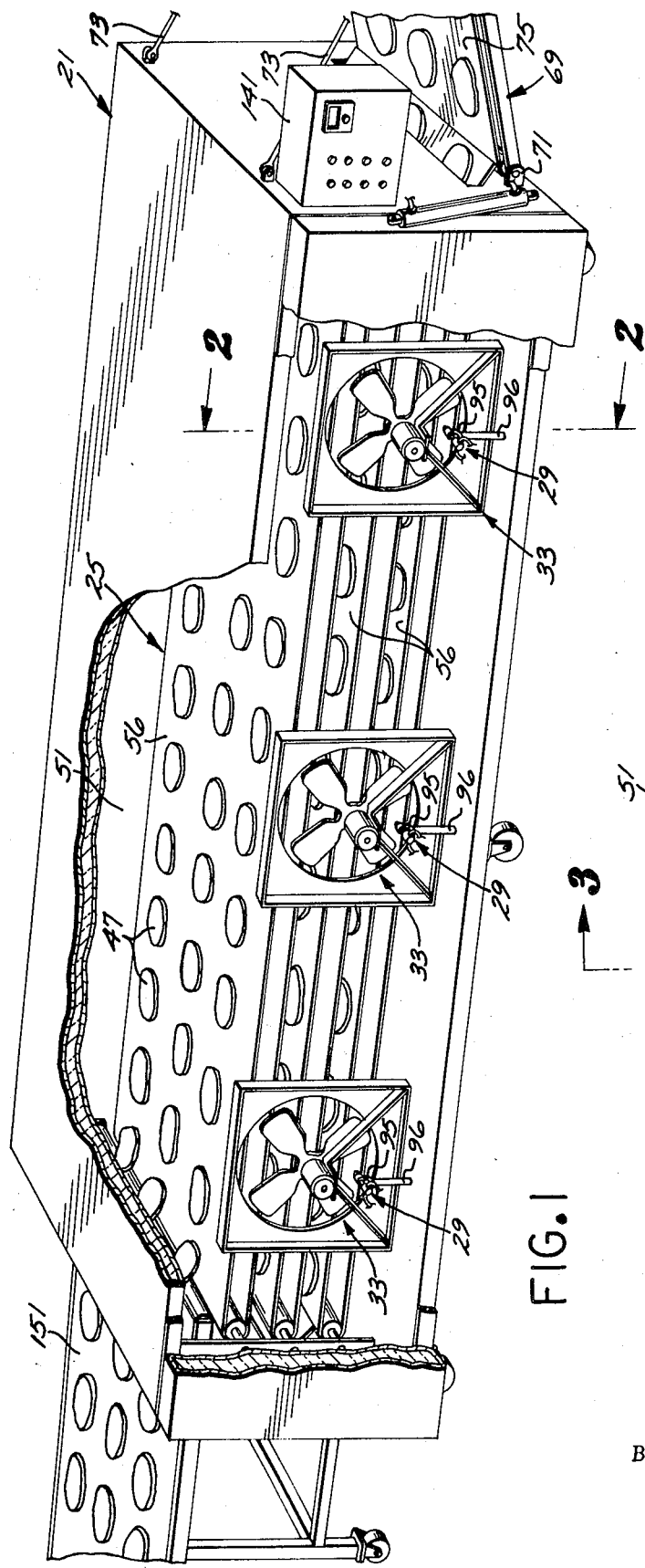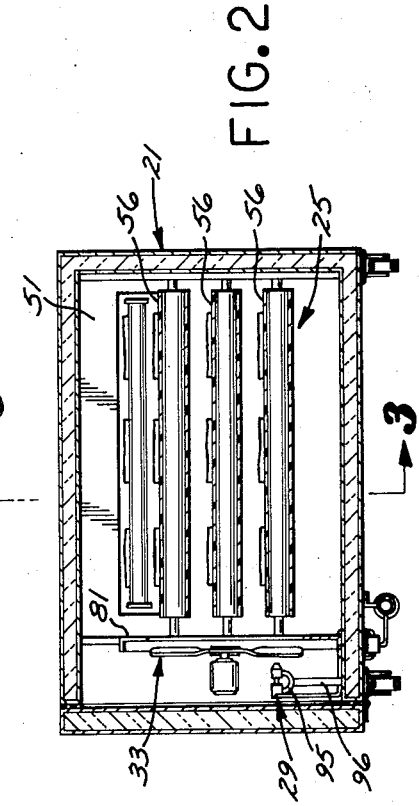

INVENTOR.
DENNIS R. BERG

CARBON DIOXIDE FOOD FREEZING METHOD AND APPARATUS

A method for quick freezing foodstuff consisting of placing the foodstuff on a conveyor for being conveyed through a freezing tunnel, delivering liquid $CO_2$ to such tunnel under pressure and spraying it through a nozzle to form a spray mixture of gaseous and finely atomized solidified $CO_2$ to act as a freezing agent. The freezing agent is circulated in heat exchange relationship with the foodstuff and the temperature in the tunnel is sensed and the rate of delivery of $CO_2$ to such tunnel controlled in response to the sensed temperature. The rate of delivery is controlled at a rate sufficient to quick freeze the foodstuff while warming the freezing agent sufficiently to transform such agent into gaseous $CO_2$ without the formation of any substantial amount of residual solid $CO_2$ in the tunnel.

An apparatus particularly adapted for carrying out the above-detailed method includes a tunnel formed with a freezing chamber and having a conveyor supported therein. Liquid $CO_2$ storage means is connected with the tunnel by means of a conduit having nozzle means on the end thereof, such nozzle means being formed with an orifice sufficiently small to restrict flow of liquid $CO_2$ therethrough sufficiently to maintain the conduit means pressurized and to spray a mixture of finely atomized solid $CO_2$ and gaseous $CO_2$ into the tunnel to act as a freezing agent. Temperature control means is provided with a temperature sensor disposed in such freezing chamber and is responsive to the sensed temperature to control the flow rate of liquid $CO_2$ to such chamber at a rate sufficient to freeze the foodstuff while enabling such foodstuff to warm the agent sufficiently to convert the agent into gaseous $CO_2$ without formation of any substantial amount of residual solid $CO_2$. Blower means is provided for circulating the agent in heat exchange relationship with the foodstuff to maintain a substantial uniform temperature in the chamber.

CROSS REFERENCE TO RELATED APPLICATION

This application is a continuation-in-part of U.S. Pat. application, Ser. No. 882,662 filed Dec. 5, 1969 now abandoned.

BACKGROUND OF THE INVENTION

1. Field of the Invention

The present invention relates generally to cryogenic quick freezing of foodstuff and more particularly, to $CO_2$ food freezing of foodstuff.

2. Description of the Prior Art

Many prior art quick freezing devices employ liquid nitrogen as a freezing agent. Because liquid nitrogen is relatively expensive, as compared to liquid $CO_2$, it is economically unfeasible to allow the nitrogen freezing agent to warm to a very high temperature before exposing the foodstuff thereto. Consequently, the foodstuff is frequently exposed to the nitrogen freezing agent while such agent is at a temperature between $-180°$ F and $-300°$ F. Subjection of many foodstuffs to temperatures substantially below $-100°$ F causes thermal shock which results in damage to the foodstuff and causes the foodstuff to wrinkle, crumble or become discolored when it is thawed and returned to room temperature for consumption. An additional shortcoming of liquid nitrogen freezing devices is that the liquid nitrogen not only costs approximately twice as much as liquid $CO_2$ but provides only one-half to one-third as much heat absorption capacity.

While numerous attempts have been made to provide a satisfactory $CO_2$ food freezing device, all such prior art devices known to applicant suffer the shortcoming that pressure drops take place in the conduit leading from the liquid $CO_2$ storage means to the spray nozzles freeze thereby resulting in the formation of particles of dry ice which may plug the nozzle orifices and frequently even freezing up the entire conduit. Additionally, such prior art devices frequently suffer the shortcoming that the delivery rate of liquid $CO_2$ to the food freezing tunnel and circulation thereof in heat exchange relationship with the foodstuff is not maintained at a rate sufficient to enable the foodstuff to warm the $CO_2$ delivered to such tunnel above the $CO_2$ boiling point thereby allowing such $CO_2$ to become solidified in the freezing tunnel before such warming takes place and necessitating a shutdown of operations to clean the tunnel for continued operation thereof.

SUMMARY OF THE INVENTION

The method for quick freezing foodstuff of present invention is characterized by conveying the foodstuff through a freezing tunnel and sensing the temperature in such tunnel to control the rate of $CO_2$ delivery to such tunnel at a rate which enables the foodstuff to warm the $CO_2$ above the boiling point thereof to thereby prevent the formation of solid $CO_2$ in the tunnel. Further, the spraying of the $CO_2$ into the tunnel is restricted to thereby maintain the conduit leading to such tunnel pressurized to prevent any substantial pressure drop in the conduit which may result in the formation of solid $CO_2$ in such conduit thereby plugging the nozzle orifice.

The apparatus for carrying out the above-described method is characterized by a conduit leading from a liquid $CO_2$ source and terminating in a nozzle means which includes orifice means that forms a sufficient restriction to maintain the conduit means pressurized. Control means is provided for controlling the rate of $CO_2$ delivery to the tunnel at a rate which causes the foodstuff to be quick frozen while enabling such foodstuff to warm the $CO_2$ delivered to such tunnel to a temperature above the boiling point of $CO_2$ to thereby prevent the formation of any substantial amount of solid $CO_2$ in the tunnel.

An object of the present invention is to provide a quick food freezing apparatus of the type described which utilizes a relatively inexpensive cryogenic fluid.

Another object of the present invention is to provide a food freezing apparatus of the type described which avoids subjecting the foodstuff to thermal shock.

These and other objects and the advantages of the present invention will become apparent from a consideration of the following detailed description when taken in conjunction with the accompanying drawings.

DESCRIPTION OF THE DRAWINGS

FIG. 1 is a perspective view, partially broken away, of a food freezing apparatus embodying the present invention;

FIG. 2 is a vertical sectional view taken along the line 2—2 of FIG. 1;

DESCRIPTION OF THE PREFERRED EMBODIMENT

Figure 4:
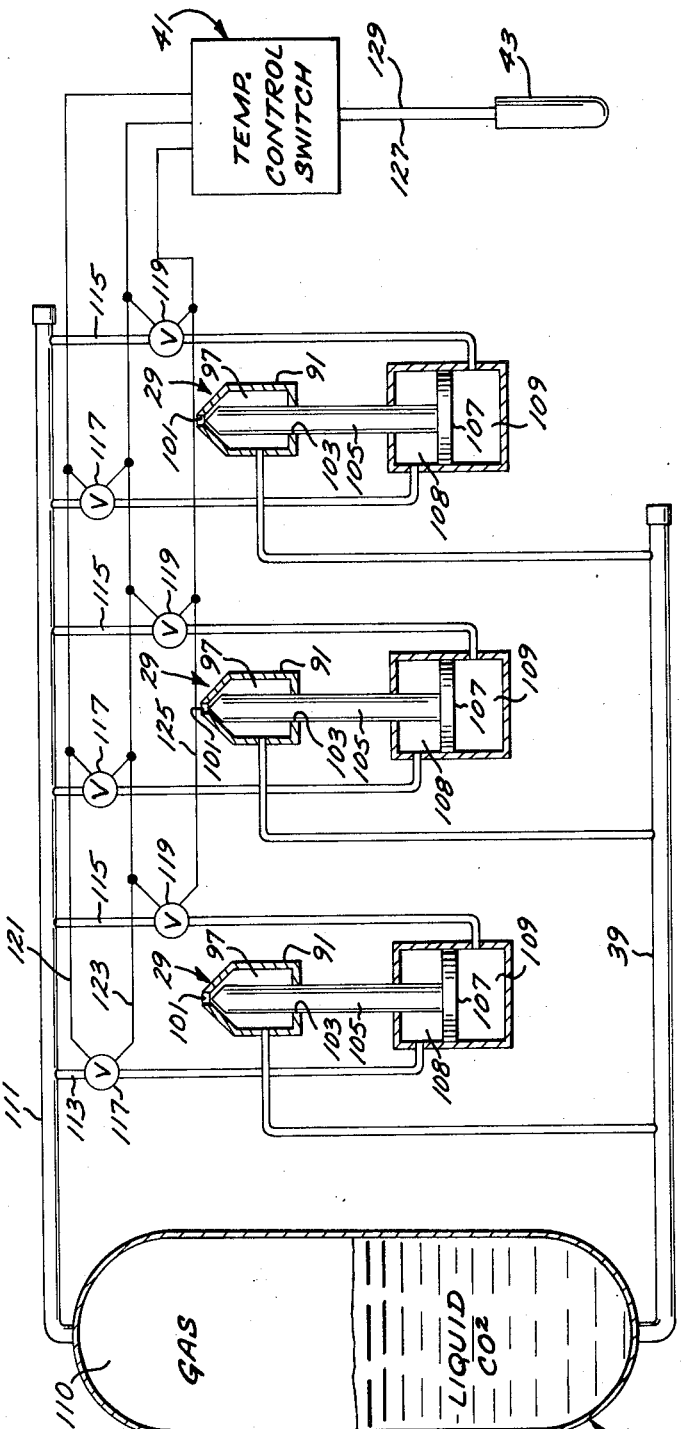
FIG. 4 is a schematic view of a temperature control system which may be utilized in the food freezing apparatus shown in FIG. 1.
Figure 5:
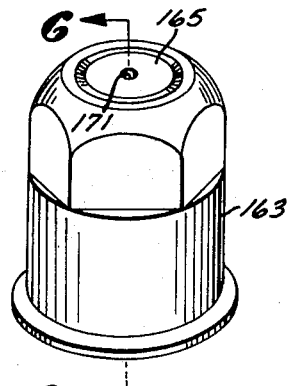
FIG. 5 is a detailed view, in enlarged scale, of a nozzle which may be utilized in the food freezing apparatus of present invention.

Referring to FIG. 1, the $CO_2$ food freezing apparatus of present invention includes, generally, a tunnel 21 having a multiple run conveyor 25 supported therein. A plurality of $CO_2$ spray nozzles 29 are mounted in the tunnel 21 for spraying $CO_2$ gas directly into the flow stream through circulating blowers 33. Referring to FIG. 4, each of the spray nozzles 29 are connected with a liquid $CO_2$ storage tank 37 by means of a liquid conduit 39 and the flow from each of the nozzles 29 is controlled by a temperature control unit 41 which is connected with a temperature sensor 43 mounted in the tunnel 21 to control the flow from such nozzles 29 at a rate which will maintain the temperature in such tunnel in a range immediately above the boiling point of $CO_2$. Thus, the liquid $CO_2$ will maintain the liquid conduit 39 fully pressurized and will be sprayed through the nozzles 29 where a pressure drop will take place causing a portion of such $CO_2$ to form finely atomized solid $CO_2$ with the remainder forming cold gaseous $CO_2$. The resultant spray mixture 46 shown in FIG. 8 will be at −109° F and will then act as a freezing agent and will be circulated in the tunnel by the blowers 33 to freeze the food products 47 moving along the conveyor 25 and be warmed to convert the entire mixture to gaseous $CO_2$ to prevent solidification thereof and the consequent formation of dry ice within the tunnel.

Figure 3:
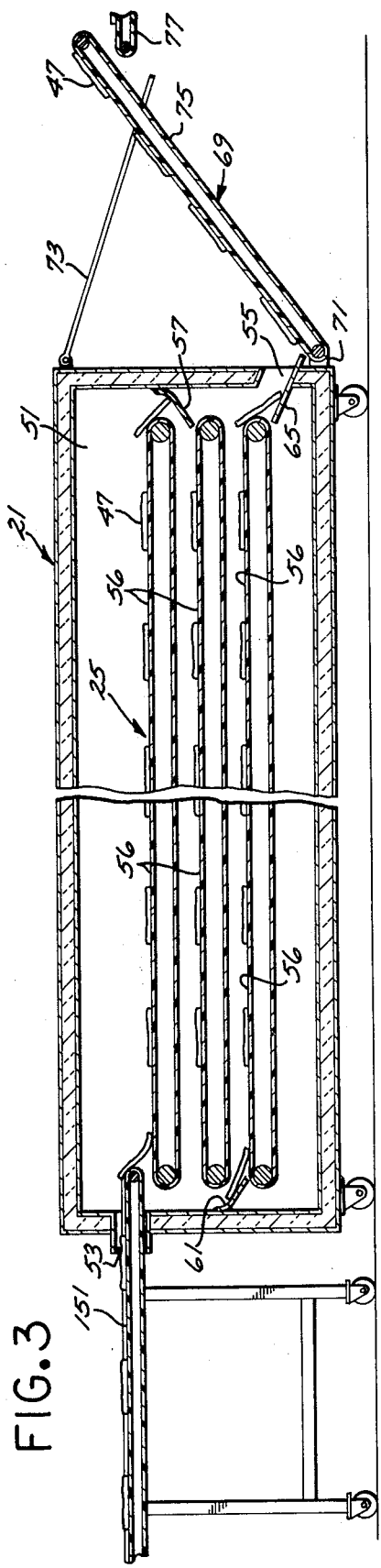
FIG. 3 is a broken vertial sectional view taken along the line 3—3 of FIG. 2.

Referring to FIG. 3, the tunnel 21 is formed with a freezing chamber 51 having an inlet 53 on its left hand end and an outlet 55 on its right hand end. The conveyor 25 may be of any conventional configuration and in the configuration depicted is formed by three layers of endless conveyor belt 56, the top conveyor belt moving to the right and dumping the foodstuff 47 on a transfer plate 57 which guides such foodstuff down to the intermediate conveyor belt 56 which moves it to the left hand end of the chamber 51 and dumps it on a transfer plate 61 that transfers such foodstuff to the bottom conveyor belt 56 which carries it to the right hand end and delivers it to an ejection plate 65.

An inclined delivery apron, generally designated 69, is carried from the right hand end of the tunnel 21 and is pivotally connected thereto at its lower end by means of hinges 71 (FIG. 1). The upper end of the incline delivery apron 69 is connected to the tunnel housing by means of a tie rod 73 that controls the inclination thereof. The apron 69 includes an endless conveyor belt 75 which rotates clockwise as shown in FIG. 3 to deliver the foodstuff 47 to a packaging conveyor 77.

Referring to FIGS. 1 and 2, the blowers 33 are arranged in a vertical orientation at the side of the conveyor 25 and are mounted in frames 81.

Referring to FIG. 4, the nozzles 29 are formed by an orifice housing 91 and a cylinder housing 93, such housings being connected by a U-shaped coupling 95 (FIG. 2) carried on the mounting struts 96. The orifice housings 91 are formed with chambers 97 that are connected with the liquid $CO_2$ conduit by means of lines 99. The front extremity of the orifice housings 91 are formed with atomizing orifices 101 having a diameter of 0.05 inches and the rear extremities of such housings are formed with bores 103 through which project control needles 105. The needles 105 are carried at their rear extremities by respective pistons 107 which reciprocate in the respective cylinder housings 93 and divide such housings into first and second pressurization chambers 108 and 109.

Positioning of the pistons 107 to control flow through the orifices 101 is accomplished by utilizing the relatively cold $CO_2$ gas available from the ullage 110 in the $CO_2$ liquid storage tank 37 to thereby avoid heating of the liquid $CO_2$ being controlled. The liquid $CO_2$ is maintained in the tank 37 at 300 PSIG and 0° F thereby maintaining the liquid conduit 39 and orifice chambers 97 at approximately the same pressure and temperature.

A vapor conduit 111 is connected with the upper end of the tank 37 and a pair of tubes 113 and 115 branch therefrom and connect with the cylinder housings 93 on opposite sides of the respective pistons 107 for communication with the respective pressurization chambers 108 and 109. Flow through the tubes 113 and 115 is controlled by respective opening valves 117 and closing valves 119.

The valves 117 and 119 are connected with the temperature control switch 41 by means of leads 121, 123 and 125. The temperature control switch 41 is, in turn, connected with the temperature probe 43 by means of leads 127 and 129.

Operation of the $CO_2$ food freezing apparatus of present invention is controlled by a control unit 141 (FIG. 1) which may be set for the conveyor speed to produce the desired freezing dwell time in the chamber 51 for the particular foodstuff being frozen. The blowers 33 are turned on and the temperature control switch 41 is energized to initiate spray from the respective nozzles 29. It is generally desirable to maintain the tunnel temperature below −80° F. In any event, the tunnel temperature should be maintained above the atmospheric boiling point of liquid carbon dioxide of approximately −109° F.

Until the temperature in the tunnel 51 is reduced to the set temperature, the control unit 41 will maintain the cooling valves 117 open to maintain the needle side of the pistons 107 pressurized and maintain the needles 105 retracted from the respective orifices 101 to provide $CO_2$ flow at a relatively rapid rate to cool the tunnel. It is particularly important that the flow rate of the liquid $CO_2$ is controlled at the exit orifice 101 rather than upstream in any of the liquid lines to thereby avoid an unnecessary pressure drop in the liquid lines which may cause the liquid carbon dioxide to flash into vapor and solidified $CO_2$ thereby interfering with the flow in such liquid line. Further, utilization of the cold $CO_2$ gas to control positioning of the nozzle needles 105 maintains such needles cold to minimize heat conduction to the liquid in the nozzle chamber 108.

When the temperature in the chamber 51 reaches $-100°$ F., the temperature sensor 43 will actuate the temperature control unit 41 to close the cooling valves 117 and open the warming valves 119 to thereby drive the control needles 105 toward the respective orifices 101 to stop flow therethrough.

The foodstuff 47 may then be placed on a feed conveyor 151 for introducing such foodstuff into the inlet 53 at the left hand end of the tunnel 51 (FIG. 3) to be fed onto the left hand end of the top conveyor belt 56. The foodstuff 47 will be conveyed to the right hand end of the top conveyor belt 56 where it will be fed onto the transfer plate 57 to be fed onto the right hand end of the intermediate conveyor belt 56 to be carried to the left hand end of such belt where it will be transferred to the transfer plate 61 and, consequently, fed onto the lower conveyor belt 56. The foodstuff 47 will move to the right along the lower conveyor belt 56 and will be delivered to the delivery apron 69 and onto the packaging conveyor 77. During the entire path through the conveyor system 25, the foodstuff 47 will be subjected to gaseous $CO_2$ at a temperature of approximately $-100°$ F to effect rapid freezing thereof to avoid dehydration and undue crystal formation therein.

Figure 9:
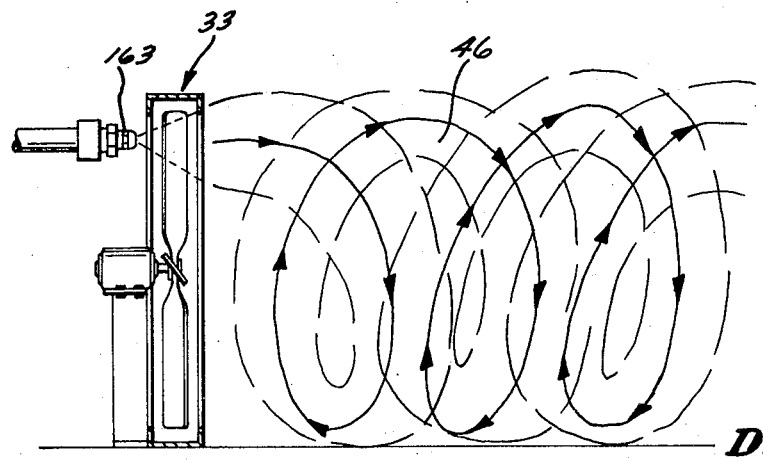
FIG. 9 is a sectional view taken along the line 9—9 of FIG. 8.

When the foodstuff 47 warms the gaseous $CO_2$ to a temperature above $-100°$ F, the sensor 43 will also be warmed to actuate the temperature control unit 41 to open the valve 117 and close the valve 115 thereby driving the respective pistons 107 downwardly as viewed in FIG. 4 to open the atomizing orifices 101 to thereby permit spraying of liquid $CO_2$ from the orifice chambers 97. As noted hereinabove the $CO_2$ will be emitted from the orifices in a mixture of finely atomized solidified $CO_2$ and gaseous $CO_2$ to thereby form a mixture of approximately one-half gaseous $CO_2$ and one-half finely atomized solidified $CO_2$ to act as a freezing agent. Such freezing agent will be at atmospheric pressure at approximately $-109°$ F and will be sprayed into the blower flow stream as shown in FIG. 9 to be circulated with the circulating gaseous currents formed thereby to be maintained suspended in the freezing chamber 51 and maintain a cold environment to continue quick freezing of the foodstuff 47.

It is particularly important that the mixing agent is maintained circulated and the temperature in the freezing chamber 51 maintained relatively uniform to thereby prevent collection of the solidified $CO_2$ particles in the bottom of such freezing chamber and on the conveyor 56 thereby resulting in plugging of such conveyor and requiring the system to be closed down while such conveyor is cleaned and repaired. The importance of this feature will become readily apparent when one considers that a packaging plant for quick frozen products may employ 40 workmen on the assembly line and such workmen would be idle while the tunnel 21 was permitted to warm sufficiently for repairmen to work therewith and such workmen would remain idle until cleaning and repair of the system is completed. It will be appreciated that the temperature control unit 41 will control the flow rate of $CO_2$ to the chambers 51 in response to the temperature sensed therein to thereby automatically increase the flow rate of $CO_2$ liquid in response to a greater rate of heat absorption by the foodstuff 47 or will automatically decrease the rate of such $CO_2$ introduction into the chamber 51 in response to a decrease in the rate of heat absorption by the foodstuff 47. That is, when the chamber 51 is again cooled to $-109°$ F, the sensor 43 will be likewise cooled and will cause the temperature control unit 41 to close the valve 117 and open the valve 119 thereby pressurizing the bottom side of the respective pistons 107 to drive the control needles 105 upwardly into engagement with the respective nozzles 101 to thereby discontinue the introduction of $CO_2$ into the freezing chamber 51 while the blowers 33 continue circulation of the cold freezing agents 46 to continue freezing of the foodstuff 47 as it passes along the conveyors 56 and warming such freezing agent to transform the entire agent into cold $CO_2$ in a gaseous state thereby preventing formation of solidified $CO_2$.

Figure 8:
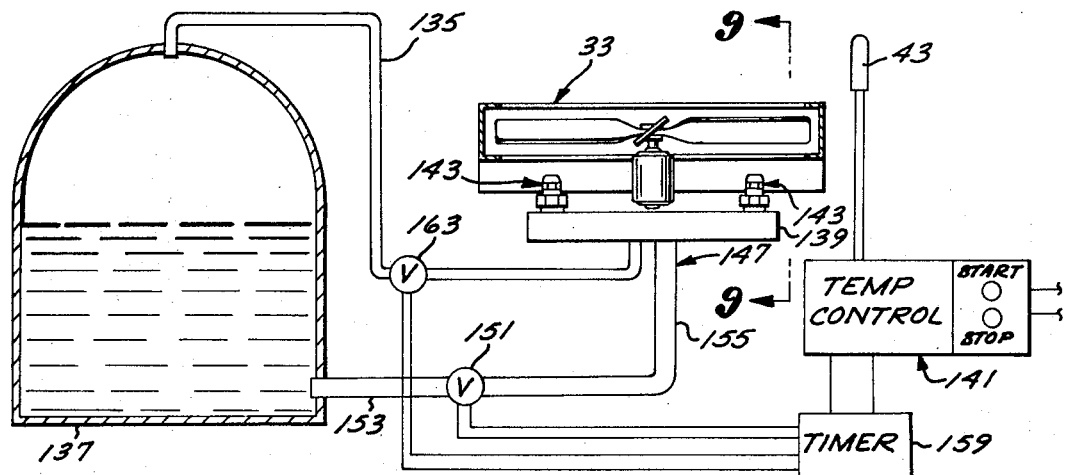
FIG. 8 is a schematic view of a second embodiment of the food freezing apparatus of present invention.

The $CO_2$ food freezing apparatus shown in FIG. 8 is similar to that shown in FIG. 1 except that it employs a vapor line 135 leading from the upper portion of a liquid $CO_2$ storage tank 137 to a manifold 139 mounting a pair of atomizing nozzles, generally designated 143, for pressurizing a liquid $CO_2$ conduit, generally designated 147, prior to introduction thereto of liquid $CO_2$. A flow control valve 151 is included in the liquid $CO_2$ conduit 147 and divides such conduit into an upstream portion 153 and a downstream portion 155, such valve 151 being controlled by a conventional timer 159 interposed between the temperature control unit 141 and such valve. The vapor conduit 135 includes a control valve 163 which is also controlled by the timer 169.

The atomizing nozzles 143 are conveniently constructed in accordance with the nozzle shown in U.S. Pat. No. 2,666,669 and includes a hollow housing 163 which has a front wall in the form of an orifice plate 165. Such orifice plate 165 is formed on its bottom side with a pair of radially inwardly leading passages 167 which lead to a central conically shaped axial passage 169 that terminates at a small orifice 171 of approximately 0.05 inches.

Screwed into the housing 163 is an atomizing fitting, generally designated 175, such atomizing fitting being formed on its bottom end with a threaded boss 177 for screwing into threads 179 formed on the interior of the housing 163. The atomizing fitting 175 is generally cylindrically shaped and is formed with a longitudinal passage 183 which terminates at the underside of its end wall 187. The opposite sides of the fitting 175 are formed with radially opening windows 189 which open into an annular chamber 191 which is in communication with the outer extremities of the passages 167 formed in the end wall 165 of the nozzle 163.

Operation of the $CO_2$ food freezing apparatus shown in FIG. 8 is similar to that of the apparatus shown in FIG. 1 except that when the sensor 43 is warmed to 100° F, the temperature controller 141 will be energized to initiate operation of the timer 159. The timer 159 will open the vapor valve 163 to introduce cold $CO_2$ vapor to the manifold 139 and the downstream portion 155 of the liquid conduit 147. The vapor valve 153 remains open until the pressure in the downstream conduit portion 155 builds up to approximately the pressure of the liquid $CO_2$ vessel 137, or approximately 300 PSIG. Thereafter, the timer 159 opens the liquid valve 151 to commence flow of liquid into the downstream conduit portion 155 and to the nozzles 143. The timer 159 then closes the vapor valve 163 and liquid flow through the liquid conduit 147 will be sufficient to maintain the pressure in such conduit at approximately 300 PSIG. While the pressure in the liquid conduit 147 may fall below 300 PSIG, it is preferable that it not fall below 150 PSIG while liquid remains therein to thereby prevent any significant pressure drop which may result in flashing of the liquid into a mixture of gaseous and solidified $CO_2$ particles which solidified $CO_2$ particles may clog the nozzle orifices 171.

Figure 6:
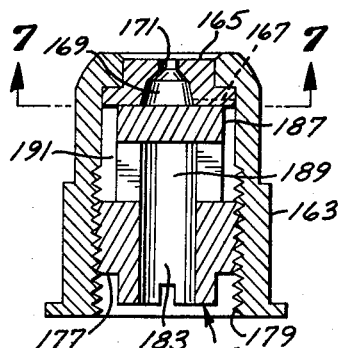
FIG. 6 is a vertical sectional view taken along the line 6—6 of FIG. 5.
Figure 7:
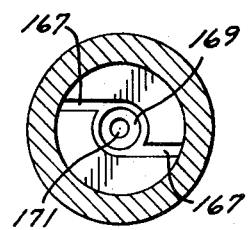
FIG. 7 is a horizontal sectional view taken along the line 7—7 of FIG. 6.

It will be appreciated that the liquid $CO_2$ introduced into the passages 183 of the atomizing fittings 175 will flow upwardly therethrough as viewed in FIG. 6 to flow outwardly through the windows 189 and into the annular chamber 191. From the annular chamber 191 such liquid will flow radially inwardly through the passages 167 (FIG. 7) and enter the passage 169 in a swirling pattern to then be sprayed from the nozzle 171 where the pressure drop will result in such $CO_2$ forming a mixture of approximately 47 percent finely atomized solidified $CO_2$ and 53 percent gaseous $CO_2$. As described hereinabove, such mixture acts as a freezing agent and the positioning of the nozzles 143 in the flow stream of the blowers 33 causes the agent to circulate within the chamber 51 and remain suspended therein to effect a rapid and thorough heat exchange with the foodstuff 47 to produce quick freezing thereof while warming such agent to vaporize the solidified $CO_2$ particles and prevent the collection in such chamber of any significant amount of residual solidified $CO_2$.

When the freezing chamber 51 reaches approximately −109° F and cools the temperature probe 43 to such temperature, the temperature control unit 141 will again energize the timer 159 to cause such timer to open the vapor valve 163 and close the liquid valve 151 to maintain the downstream portion 153 of the liquid conduit 147 pressurized while such downstream portion is purged of liquid $CO_2$ to thereby prevent lowering of the pressure therein and consequent formation of solidified $CO_2$ particles which may plug the respective orifices 171 and thereby prevent the flow therethrough of liquid $CO_2$ the next time there is a call for cooling in the freezing chamber 51.

When the freezing chamber 51 is again warmed to −109° F thereby warming the temperature sensor 43, the temperature control unit will again be energized to commence operation of the timer 159 to again open the vapor valve 163 to pressurize the downstream liquid conduit portion 155 and subsequently open the liquid valve 151 and then close the vapor valve 163.

From the foregoing it will be apparent that the $CO_2$ food freezing apparatus of present invention provides a convenient means for quick freezing foodstuffs with a relatively inexpensive cryogenic liquid. The apparatus of present invention enables the entire liquid conduit to be maintained at a relatively high pressure between the $CO_2$ storage tank and the atomizing nozzle to thereby prevent the formation in such conduits of solidified $CO_2$. Further, the delivery rate of $CO_2$ to the freezing chamber is controlled at a rate which enables the foodstuff in such chamber to maintain the $CO_2$ warmed above its boiling temperature to prevent the formation in such chamber of any substantial amount of solidified $CO_2$.

Various modifications and changes may be made with regard to the foregoing detailed description without departing from the spirit of the invention.

I claim:

1. A method for quick freezing individual items of foodstuff and comprising the following steps:
    placing said items on a conveyor for being conveyed through a freezing tunnel;
    delivering liquid $CO_2$ to said tunnel under sufficient pressure to maintain such $CO_2$ in its liquid state and spraying it through a nozzle to form a mixture of gaseous and finely atomized particles of solidified $CO_2$ which act as a freezing agent and controlling delivery of such agent at a rate which will cause the heat transfer between said foodstuff and freezing agent to warm said solidified $CO_2$ particles sufficiently to cause said solidified particles to sublimate; blowing said freezing agent throughout said chamber and over said foodstuff at a rate which will maintain said solidified $CO_2$ suspended in said chamber until said foodstuff warms said particles sufficiently to sublimate said particles;
    sensing the temperature in said tunnel and utilizing the temperature sensed to vary the rate of $CO_2$ delivery to said tunnel in accordance with the rate at which said freezing agent is warmed to maintain the temperature in said tunnel above the temperature at which $CO_2$ will form in large masses.

2. A method for quick freezing foodstuff as set forth in claim 1 wherein:
    said freezing agent is delivered directly into the flow stream developed by blowing said freezing agent.

3. A method for quick freezing foodstuff as set forth in claim 1 wherein:
    the delivery of liquid $CO_2$ to said tunnel is controlled at a rate sufficient to enable said items to maintain said tunnel heated to a temperature slightly above the boiling temperature of said $CO_2$.

4. A method for quick freezing foodstuff as set forth in claim 1 wherein:
    said liquid $CO_2$ is delivered through a conduit to said nozzle and said method includes;
    the step of purging said conduit and pressurizing it with a gaseous cryogenic gas prior to introduction thereto of liquid $CO_2$.

5. A method for quick freezing foodstuff as set forth in claim 1 wherein:
    said liquid $CO_2$ is delivered through a conduit to said nozzle and that includes;
    the step of maintaining said conduit pressurized to a pressure above 150 PSIG during freezing of said foodstuff.

6. A method for quick freezing foodstuff as set forth in claim 1 wherein:
    said liquid $CO_2$ is delivered through a conduit to said nozzle and that includes;
    the step of maintaining said conduit pressurized to a pressure above 250 PSIG during freezing of said foodstuff.

7. $CO_2$ food freezing apparatus comprising:
    a tunnel formed with a freezing chamber;
    conveyor means supported in said chamber;
    liquid $CO_2$ storage means;
    liquid conduit means leading from the lower portion of said storage means to said chamber;

nozzle means connected with said conduit means and formed with orifice means providing a sufficient restriction to liquid $CO_2$ flow therethrough to maintain said conduit means substantially pressurized during flow therethrough of liquid $CO_2$ and to spray a mixture of finely atomized solid particles of $CO_2$ and gaseous $CO_2$ into said tunnel to act as a freezing agent;

flow control means operative to control the flow rate from said nozzle means;

a temperature sensor in said chamber;

temperature control means connected between said temperature sensor and flow control means and responsive to the temperature in said chamber to control said flow control means to maintain the flow of said $CO_2$ through said nozzle at a rate sufficient to cause the heat exchange between said freezing agent and foodstuff being conveyed on said conveyor to warm said agent sufficiently to sublimate said particles without the formation of any substantial amount of residual solid $CO_2$; and blower means for blowing a flow stream past said nozzles to carry said agent in suspension throughout said chamber and in heat exchange relationship with said foodstuff to maintain said particles suspended in said chamber until said particles are fully sublimated.

8. $CO_2$ food freezing apparatus as set forth in claim 7 wherein:

said temperature control means is responsive to said temperature sensor to maintain the temperature in said chamber below $-90°$ F.

9. $CO_2$ food freezing apparatus as set forth in claim 7 wherein:

said temperature control means is responsive to said temperature sensor to maintain said liquid $CO_2$ flowing at a rate sufficient to maintain the temperature in said conduit means leading to said nozzle below $-75°$ F.

10. $CO_2$ food freezing apparatus as set forth in claim 7 wherein:

said nozzle means includes a housing formed with an outlet orifice; and said flow control means controls the flow rate at said orifice to thereby produce any pressure drop resulting from the restriction by said flow control means at said outlet orifice.

11. $CO_2$ food freezing apparatus as set forth in claim 10 wherein:

said nozzle means is formed with orifice means of sufficient size to maintain the pressure in said conduit means above 100 PSIG during normal operation of said apparatus.

12. $CO_2$ food freezing apparatus as set forth in claim 10 wherein:

said nozzle means is formed with orifice means of sufficient size to maintain the pressure in said conduit means above 200 PSIG during normal operation of said apparatus.

13. $CO_2$ food freezing apparatus as set forth in claim 10 wherein:

said flow control means includes a needle for cooperating with said orifice to control the flow rate therethrough.

14. $CO_2$ food freezing apparatus as set forth in claim 7 wherein:

said nozzle means includes a movable flow adjustment element operative to control the flow rate from said nozzle; and said control means includes a control housing carrying a movable drive member coupled with said adjustment element for controlling the positioning thereof, said control housing being formed with a pressurization chamber disposed on one side of said movable member, said control means further including a line connecting said $CO_2$ supply means with said pressurization chamber and means for controlling communication through said line whereby said pressurization chamber may be pressurized with $CO_2$ to shift said movable member and move said adjustment element to adjust the flow rate through said nozzle means.

15. $CO_2$ food freezing apparatus as set forth in claim 14 wherein:

said control housing is formed with a second control chamber disposed on the side of said movable member opposite said one side and said flow control means includes a line leading from said storage means to said second control chamber and means connected with said temperature control means for controlling pressure communication through said second line whereby said first control chamber may be pressurized to shift said movable member in one direction and said second control chamber may be pressurized to shift said movable member in the opposite direction.

16. $CO_2$ food freezing apparatus as set forth in claim 14 wherein:

said line is connected to the upper portion of said storage means to communicate gaseous $CO_2$ to said control chamber.

17. $CO_2$ food freezing apparatus as set forth in claim 7 wherein:

said flow control means includes liquid valve means in said liquid conduit means and said apparatus includes;

pressurization means including a pressurization line connected with said liquid conduit means intermediate said liquid valve means and said nozzle means for pressurizing said conduit means with a pressurization gas prior to introduction thereto of liquid $CO_2$.

18. $CO_2$ food freezing apparatus as set forth in claim 17 wherein:

said pressurization conduit is connected with the upper portion of said liquid $CO_2$ storage means for pressurization said conduit means with gaseous $CO_2$.

19. A method for quick freezing foodstuff as set forth in claim 17 that includes:

timing means for automatically acutating said flow control means a predetermined time after said pressurization means is actuated.

20. A $CO_2$ food freezing apparatus as set forth in claim 17 wherein:

said pressurization conduit is connected to the upper portion of said $CO_2$ storage means for receiving $CO_2$ therefrom for delivery to said liquid conduit means in a gaseous state and a pressurization valve in said pressurization conduit for controlling flow therein.

* * * * *